United States Patent
Ueda et al.

(10) Patent No.: US 6,802,651 B2
(45) Date of Patent: Oct. 12, 2004

(54) RETAINER

(75) Inventors: Koji Ueda, Fujisawa (JP); Yuji Miyamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 81 days.

(21) Appl. No.: 10/343,793

(22) PCT Filed: Jun. 12, 2002

(86) PCT No.: PCT/JP02/05844

§ 371 (c)(1),
(2), (4) Date: Feb. 4, 2003

(87) PCT Pub. No.: WO02/101253

PCT Pub. Date: Dec. 19, 2002

(65) Prior Publication Data

US 2003/0190105 A1 Oct. 9, 2003

(30) Foreign Application Priority Data

Jun. 12, 2001 (JP) .................................. 2001-177695

(51) Int. Cl.[7] ............................................. F16C 33/44
(52) U.S. Cl. ....................... 384/527; 384/573; 384/625
(58) Field of Search .................... 384/527, 573, 384/572, 625, 614, 623

(56) References Cited

U.S. PATENT DOCUMENTS

2001/0048781 A1   12/2001   Kawamura et al.

FOREIGN PATENT DOCUMENTS

| GB | 2352277 | 1/2001 |
|---|---|---|
| JP | 06341442 | 12/1994 |
| JP | 11182556 | 7/1999 |
| JP | 2001049346 | 2/2001 |
| JP | 2001090734 | 4/2001 |
| JP | 2001336538 | 12/2001 |

*Primary Examiner*—Lenard A. Footland
(74) *Attorney, Agent, or Firm*—Crowell & Moring LLP

(57) ABSTRACT

The present invention provides a cage in which a nitride layer is formed on the surface by using an iron and steel material with a carbon content of 0.25% by weight or less, fabricating it into a predetermined shape and conducting nitriding, which is more excellent in slidability and wear resistance than conventional one. For this purpose, a nitride layer having a hardness of Hv 650 or more at a thickness of 3 μm or more and 15 μm or less is formed on the surface of a cage.

4 Claims, 9 Drawing Sheets

Photograph for nitride layer ively high temperature nitriding (400 to 540° C.) is lower than that in gas softening nitriding (550 to 600° C.).

RETAINER

TECHNICAL FIELD

This invention relates to a cage for use in a rolling bearing.

BACKGROUND ART

Heretofore, as a cage for use in a rolling bearing under going large load, a machined cage made of high strength brass excellent in the mechanical strength has been used. While the cage is excellent in the slidability and the wear resistance due to self-lubricity, since the material cost is high, the fabrications cost is high, and the yield is low, it is used only for special applications.

On the contrary, a pressed cage formed by fabricating a cold rolled steel sheet typically represented by SPCC or a hot rolled steel sheet typically represented by SPDH by pressing into a predetermined shape is advantageous in view of the cost compared with the machined cage made of high strength brass, but it is poor in the slidability and the wear resistance. Therefore, it has been conducted to improve the slidability and the wear resistance of the pressed cage by applying nitriding thereby forming a hard nitride layer on the surface of the cage.

Generally, when nitriding is applied to an iron and steel member comprising a low carbon steel such as SPCC or SPDH (iron and steel material with carbon content of 0.25% by weight or less), nitrogen and iron are reacted on the surface of the iron and steel member, by which nitrogen atoms diffuse into the iron and steel member and a layer comprising a nitrogen compound (nitride layer) is formed on the surface. The nitride layer forms a phase at higher nitrogen concentration toward the surface of the member. That is, the phase of the nitride layer changes from the vicinity at the boundary with the base material at the innermost site toward the outermost surface in the order of $\gamma'$ phase ($Fe_4N$), $\epsilon$ phase ($Fe_{2-3}N$), and $\xi$ phase($Fe_2N$).

In the nitriding conducted in existent pressed cage ("Tufftride method" and gas softening nitriding), since nitriding is applied at a high temperature of 550–600° C., the $\epsilon$ phase and the $\xi$ phase at the surface tend to form a porous structure. When the distribution for the hardness in the surface layer portion of the nitride layer obtained by the gas softening nitriding method by a nano-indentation method accurately at an interval of several micro orders, while the hardness is Hv 600 or more at the depth of about 10 $\mu$m but it is sometimes less than Hv 500 at the outermost surface as shown at (b) in the graph of FIG. 3. In the measurement for the hardness by an existent micro-vickers tester, the distribution for the hardness on the surface layer of the nitride layer can not be measured at an interval of several $\mu$m.

Further, in the existent method describe above, the nitride layer is formed at a large thickness by making the processing time longer upon nitriding or increasing the nitrogen potential in the treating atmosphere while considering the decrease in the thickness of the nitride layer by wear during use of the cage. In accordance therewith, the nitrogen concentration in the nitride layer becomes higher and most of the nitride layer sometimes forms the $\xi$ phase. The $\xi$ phase is poor in the toughness and tends to suffer from sharing fracture easily by sliding friction with rolling elements and tends to drop easily from the surface of the cage. As a result, it is difficult to obtain the effect of improving the slidability and the wear resistance.

On the other hand, Japanese Published Unexamined Patent Publication Hei 10-2336 describes that fluoridation of replacing the oxide on the surface of the cage with a metal fluoride film before nitriding forms a uniform and dense nitride layer comprising nitrides with an average grain size of 1 $\mu$m or less on the surface of the cage. However, since the wear resistance of the cage greatly depends on the type and the hardness of the nitride layer, the slidability and the wear resistance are sometimes insufficient by merely making the nitride grain size finer on the outermost surface like the cage described in the above noted publication.

Further, Japanese Published Unexamined Patent Publication 2001-90734 proposes formation of a dense nitride layer of 3–20 $\mu$m thickness and a nitride layer of a porous structure of 2–25 $\mu$m thickness on the surface of a pressed cage by nitriding. According to this proposal, both the surface hardness and the lubricant retaining performance of the pressed cage are made favorable and improvement is expected for the wear resistance. However, even by the proposal, no sufficient wear resistance can sometimes be obtained in a severe lubrication circumstance in which a lubricant film is less formed.

Further, it is also necessary to prevent degradation of the mechanical strength of the cage by the nitriding.

The present invention has been accomplished taking notice on the subject in the prior art as described above, and it is an object thereof to provide a cage more excellent in the slidability and the wear resistance than usual in a cage in which a nitride layer is formed on the surface by using an iron and steel material with carbon content of 0.25% by weight or less, fabricating the same into a predetermined shape and applying nitriding, and to increase the mechanical strength of the cage.

DISCLOSURE OF THE INVENTION

For solving the subject described above, the present invention provides a cage in which a nitride layer is formed on a surface by using an iron and steel material with a carbon content of 0.25% by weight or less and fabricating the same into a predetermined shape and then conducting nitriding, having a nitride layer with a hardness of 650 or more in vickers hardness (Hv) at a thickness of 3 or more and 15 $\mu$m or less.

By the way, even when it is intended to measure the distribution of the hardness in the direction of the depth of a thin layer such as a nitride layer in the measurement for the hardness by an existent micro-vickers tester at an interval of several micron meters, no accurate measurement is possible since reading error is large or indentation diameter increases due to excessive load, but accurate measurement is possible by the nano-indentation method. Accordingly, the hardness of the nitride layer in the cage of the present invention should be measured by a nano-indentation method. Further, when it is measured by the nano-indentation method, measurement is conducted in a state of where the indentation diameter is at least 5 to 50% for the thickness of the nitride layer.

The cage of the present invention is obtained by applying the nitriding to the cage formed of an iron and steel material such that formation of the $\xi$ phase is suppressed and a nitride layer comprising $\gamma'$ phase, $\epsilon$ phase or($\gamma'$+$\epsilon$)phase is formed. As the method, it can be mentioned that the reaction rate of nitriding is retarded and the temperature for nitriding is preferably 400 to 550° C. and, more preferably, 400 to 540° C.

Further, when nitriding is applied at relatively high temperature after forming the cage by pressing from a steel sheet formed of a low carbon steel, since work strains during pressing are relieved during nitriding, the cage tends to form deformation. However, the heat treatment deformation caused to the cage can be suppressed by applying the nitriding in the temperature range described above that is a temperature range in which recrystallization dose not occur in the low carbon steel.

When the temperature for the nitriding is 560° C. or higher or the treatment time is longer, since the thickness of the nitride layer exceeds 15 μm in which the ξ phase is formed to the outermost surface of the nitride layer making it porous and deteriorating the hardness and the toughness of the nitride layer, no good slidability and wear resistance can be obtained. On the contrary, when the thickness of the nitride layer is less than 3 μm, the thickness of the nitride layer tends to become not uniform possibly forming a portion where the nitride layer is not formed, good slidability and wear resistance can not be obtained reliably.

Good slidability and wear resistance can be obtained reliably by controlling the thickness of the nitride layer to 3 μm or more and 15 μm or less. The thickness of the nitride layer is, preferably, 5 μm or more and 13 μm or less and, more preferably, 8 μm or more and 12 μm or less.

That is, the cage of the present invention comprises an iron and steel material with the carbon content of 0.25% by weight or less in which a nitride layer comprising not ξ phase but γ' phase, ε phase or (γ'+ε) phase is formed on the surface. Thus, as shown in by (a) in the graph of FIG. 3, in the cage of the present invention, the hardness of the nitride layer is Hv 650 or more even at a depth of about 1 μm from the surface and it is formed to a substantially uniform hardness along the direction of the thickness of the nitride layer.

The method of forming a nitride layer comprising γ' phase, ε phase (γ'+ε) phase to the surface of a cage formed of an iron and steel material with the carbon contend of 0.25% by weight or less can include, for example, (1) a method of keeping in a mixed gas of a nitrogen gas and an ammonia gas at 450–540° C. for 2–3 hours (gas soft nitriding method at low temperature), (2) a method of applying fluoridation by using a fluorine gas such as $NF_3$ (nitrogen trifluoride) at about 200–400° C. and then keeping the same in an $NH_3$ gas at 400–540° C. for 1–3 hours("Nv super nitriding", commercial name of Air Water Inc.), (3) a method of dipping in a special salt bath and keeping at a low temperature of 450–530° C. for 1–3 hours by "Tufftride method" for 1–3 hours ("Palsonite treatment", registered trademark of (Nippon Parkarizing Co.) and (4) a method of applying glow discharge at a temperature of about 500–550° C. for about 10 hours in a mixed gas atmosphere of nitrogen and hydrogen while using the cage as a cathode and a inner wall of the processing furnace as an anode (ion nitriding).

The nitriding method for obtaining the cage of the present invention (that is, a method of forming a nitride layer comprising γ' phase, ε phase or (γ'+ε) phase to the surface of a cage formed of an iron and steel material with the carbon content of 0.25% by weight or less) is not restricted to the methods (1) - (4) described above.

It is preferred that the cage of the present invention has a diffusion layer formed by dispersion of nitrogen in a matrix just bellow the nitride layer at a thickness of 50 μm or more and 500 μm or less, in which the vickers hardness (H1) is 160 or more at a position for the depth of 30 μm from the boundary between the diffusion layer and the nitride layer, and the ratio (H1/H2) of the vickers hardness (H1) of the diffusion layer relative to the hardness (H2) of the core portion; is 1.30 or more. It is further preferred that the hardness (H1) of the diffusion layer is 223 or more by the vickers hardness and the ratio(H1/H2) is 2.50 or less.

Further, in view of the impact resistance, the hardness (H1) of the diffusion layer is preferably 300 or less and, further preferably, 280 or less by the vickers hardness. However, in an application use requiring not so high impact resistance since no large impact is applied, the hardness (H1) of the diffusion layer may exceed 300 in the vickers hardness and the upper limit for the hardness in this case is, for example, 350 in the vickers hardness.

When nitriding is applied to the iron and steel material comprising low carbon steel such as SPCC or SPDH (iron and steel material with carbon content of 0.25% by weight or less), a diffusion layer in which nitrogen is diffused in the matrix is formed just below the nitride layer formed on the surface (core side). The mechanical strength of cage is increased by defining the diffusion layer to the constitution described above.

Further, the pressed cage is work hardened by plastic work strain applied upon pressing. As described above, the work hardening can be kept by applying the nitriding in a temperature range not causing recrystallization in the low carbon steel (preferably at 400–500° C., more preferably, 400–540° C.). When the work hardening is kept, the diffusion layer of the constitution described above can be formed just below the nitride layer. The nitriding method capable of keeping the work hardening also after nitriding can include, for example, the methods (1)–(4) described above.

Also in the case of applying the nitriding at a temperature higher than the recrystallization temperature of steel, the diffusion layer of the constitution described above can be formed just bellow the nitride layer by (1) a method of increasing the cooling rate after nitriding (conducting oil cooling or water cooling), or (2) a method of applying a predetermined post treatment after cooling (air cooling or gradual cooling) by a reduced rate.

In a state where nitrogen in the diffusion layer reacts with iron as a matrix to precipitate bar—shape or needle—shape nitrides, the strength of the matrix is lowered due to lowering of the nitrogen concentration in the matrix (ferrite) (refer to FIG. 6). Precipitation of nitrides can be suppressed by the method (1) and (2) described above.

The post treatment conducted in the method(2)can include a method of heating in atmospheric air or in an inert gas such as argon or nitrogen to a temperature of 300° C. or higher and then applying oil cooling or water cooling. According to this method, since the cooling rate after nitriding is slow, and nitrides ($Fe_4N$) precipitated in the diffusion layer are solid solubilized into the matrix in the heating step described above, the nitrogen concentration in the matrix is increased. According to the method (2), since the temperature for starting rapid cooling can be lowered compared with the method (1), it also has an effect capable of decreasing the deformation of the cage.

It is preferred that the cage of the present invention has an oxide layer comprising an $Fe_3O_4$ phase as a main ingredient and not containing an $Fe_2O_3$ phase to a thickness of 50 nm or more nearer to a further surface on the nitride layer.

The cage having an oxide layer comprising the $Fe_3O_4$ phase as a main ingredient and not containing the $Fe_2O_3$ phase on the surface has increased self-lubricity compared with the case of not having the oxide layer. Provision of the nitride layer under the oxide layer can provide the self-lubricity of the oxide layer effectively and can enhance the corrosion resistance. When the thickness of the oxide layer is less than 50 nm, no substantial effect can be obtained.

BEST MODE FOR PRACTICING THE INVENTION

Figure 1:
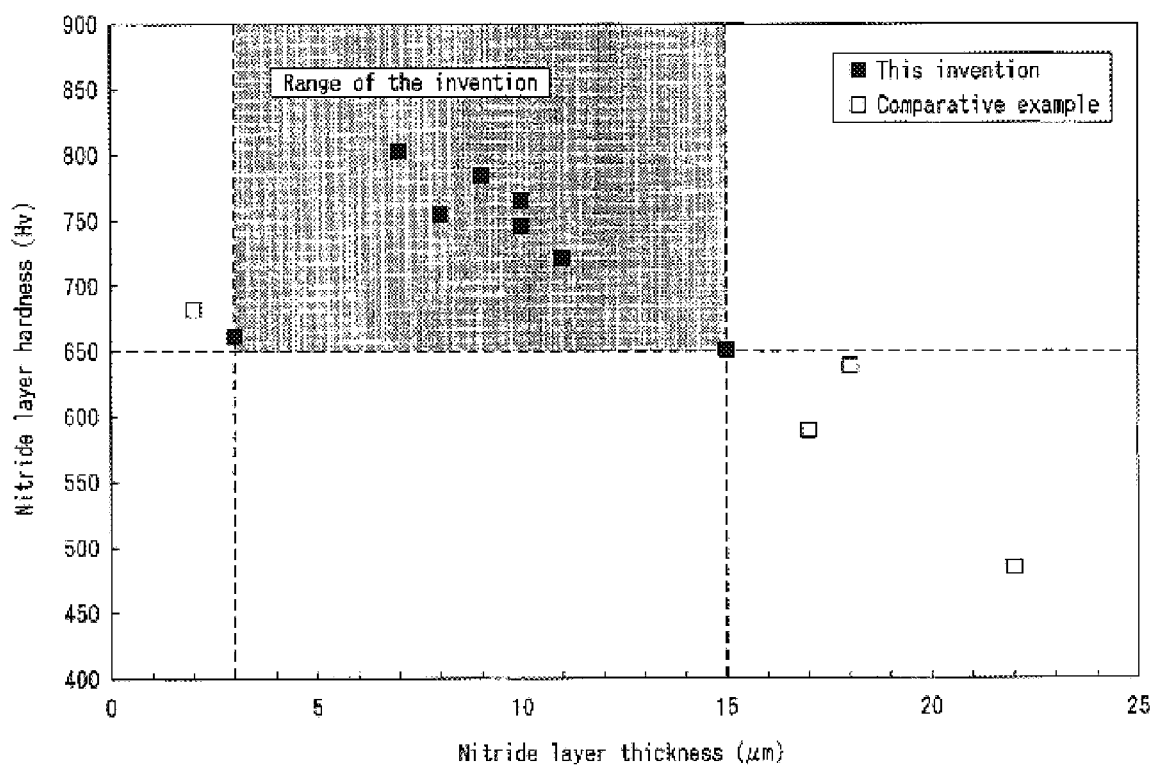
FIG. 1 is a view plotting the result of each of examples and comparative examples in a first embodiment as a graph expressing the thickness of a nitride layer on the abscissa and the hardness of the nitride layer on the ordinate.

Preferred embodiments according to the present invention are to be described below.

First Embodiment

At first, a cage for use in an automatic self-aligning roller bearing (JIS bearing No. 22310) was manufactured by a pressing method using a cold rolled steel sheet made of SPCC. Then, a nitride layer was formed in various thickness on the surface of each of cages by conducting the treatments (1)–(4) described above and (5) and (6) to be described later under respective conditions.

(5) A method of dipping a cage in a mixed salt bath of sodium cyanide and sodium cyanate and applying a heat treatment at 550–600° C. for 1 to 3 hours (salt bath soft nitriding referred to "Tufftride method"). (6) A method of keeping in a gas mixture comprising an RX gas and an ammonia gas at 550–600° C. for 0.3 to 5 hours (existence gas soft nitriding).

In No. 1-1, the method (1) was conducted under the conditions at a temperature of 540° C. and for a treatment time of 1.5 hours. In No. 1-2, the method (1) was conducted under the conditions at a temperature of 540° C. and for a treatment time of 1.0 hours. In No. 1-3, the method (1) was conducted under the conditions at a temperature of 540° C. and for a treatment time of 0.5 hours. In No. 1-4, after conducting the fluoridation of the method (2), a treatment of keeping in an $NH_3$ gas atmosphere was conducted under the conditions at a temperature of 400–480° C. and for a treatment time of 24 hours. In No. 1-5, after conducting the fluoridation of the method (2), a treatment of keeping in an $NH_3$ gas atmosphere was conducted under the conditions at a temperature of 480–540° C. and for a treatment time of 3 hours.

In No. 1-6, the method (3) was conducted under the conditions at a temperature of 450–470° C. and for a treatment times of 3 hours. In No. 1-7, the method (3) was conducted under the conditions at a temperature of 470–500° C. and for a treatment times of 3 hours. In No. 1-8, the method (4) was conducted under the conditions at a temperature of 500–550° C. and for a treatment times of 10 hours.

In No. 1-9, the method (5) was conducted under the conditions at a treatment temperature of 570° C. and for a treatment time of 1.5 hours. In No. 1-10, the method (5) was conducted under the conditions at a treatment temperature of 560° C. and for a treatment time of 1.5 hours. In No. 1-10, the method (6) was conducted under the conditions at a treatment temperature of 570° C. and for a treatment time of 1.5 hours. In No. 1-12, the method (6) was conducted under the conditions at a treatment temperature of 570° C. and for a treatment time of 0.25 hours.

For cooling after nitriding, oil cooling was conducted in Nos. 1-1 to 1-3 and Nos. 1-6 to 1-12. In No. 1-4 and No. 1-5, gradual cooling was conducted after nitriding and then heating was conducted at 400° C. for 1 hour in an atmospheric air, followed by water cooling.

Then, a self-aligning roller bearing was assembled by using each of the obtained cages, an unbalanced weight was attached to a shaft, a lubricant "VG5" was supplied from an oil bath while compulsorily applying vibrations at a maximum amplitude of 0.7 mm to the bearing by the rotation of the weight, and a test of rotating the shaft at a rotational speed of 3000 $min^{-1}$ for 2000 hours was conducted. The weight of the cage was measured before and after the test and the amount of weight reduction was calculated as a wear amount.

Further, for each of the obtained cages, posts of the cage were cut out, the cut cross section was polished, and indentation hardness at the polished surface was measured at a position of 2 to 4 $\mu$m depth from the outermost surface by a nano-indentation method. That is, it was measured under an indentation load 5 gf ($49 \times 10^{-3}$N) by using a micro miniature indentation hardness tester "ENT-1100a" manufactured by ERYONICS Co. Further, indentation hardness of a standard test specimen for the micro vickers hardness (Hv 400, Hv 600) was previously measured by a tester described above to prepare a calibration line. Using the calibration line, the indentation hardness measured by the tester was converted into vickers hardness.

Further, thickness of the nitride layer formed was measured by a photograph magnified at a factor of 1000 by an optical microscope for the polished surface of the cage.

The results of the measurement are shown in the following Table 1.

TABLE 1

|  | No. | Nitriding | | | Nitride layer | | Wear |
|---|---|---|---|---|---|---|---|
|  |  | Method | Temperature (° C.) | Cooling condition after nitriding | Thickness (μm) | Hardness (Hv) | amount (mg) |
| Examples | 1-1 | (1) | 540 | Oil cooling | 15 | 650 | 31 |
|  | 1-2 | (1) | 540 | Oil cooling | 10 | 745 | 24 |
|  | 1-3 | (1) | 540 | Oil cooling | 3 | 661 | 28 |
|  | 1-4 | (2) | 400~480 | Gradual cooling→ | 12 | 720 | 24 |
|  | 1-5 | (2) | 480~540 | Heating→Water cooling | 8 | 755 | 19 |
|  | 1-6 | (3) | 450~470 | Oil cooling | 9 | 784 | 23 |
|  | 1-7 | (3) | 470~500 | Oil cooling | 10 | 765 | 25 |
|  | 1-8 | (4) | 500~550 | Oil cooling | 7 | 803 | 20 |
| Comparative | 1-9 | (5) | 570 | Oil cooling | 17 | 588 | 55 |
| Examples | 1-10 | (5) | 560 | Oil cooling | 18 | 638 | 53 |
|  | 1-11 | (6) | 570 | Oil cooling | 22 | 485 | 60 |
|  | 1-12 | (6) | 570 | Oil cooling | 2 | 680 | 57 |

Figure 2:
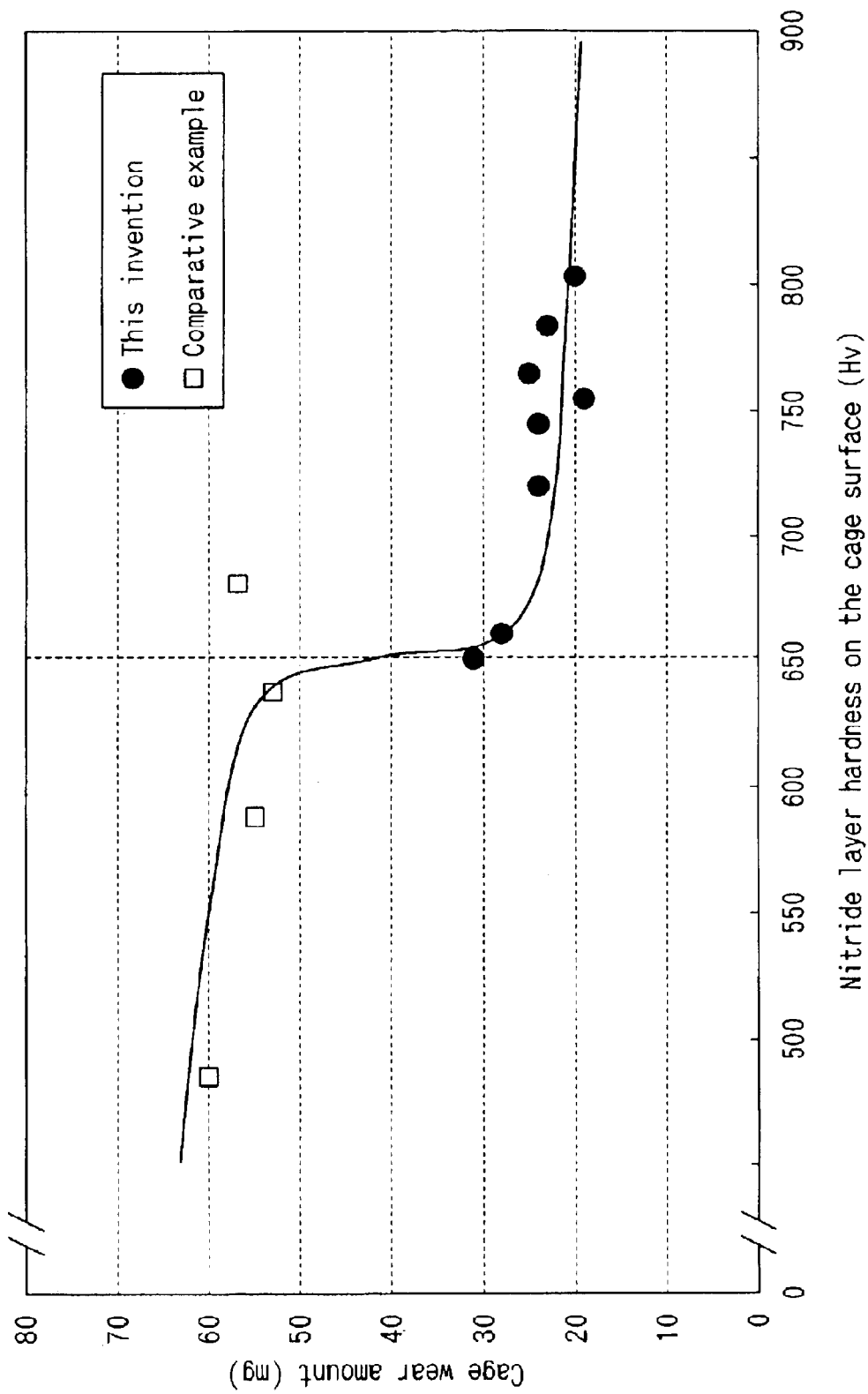
FIG. 2 is a graph showing a relation between the hardness of the nitride layer on the surface of a cage and the wear amount of the cage by the result obtained in a test for the first embodiment.
Figure 3:
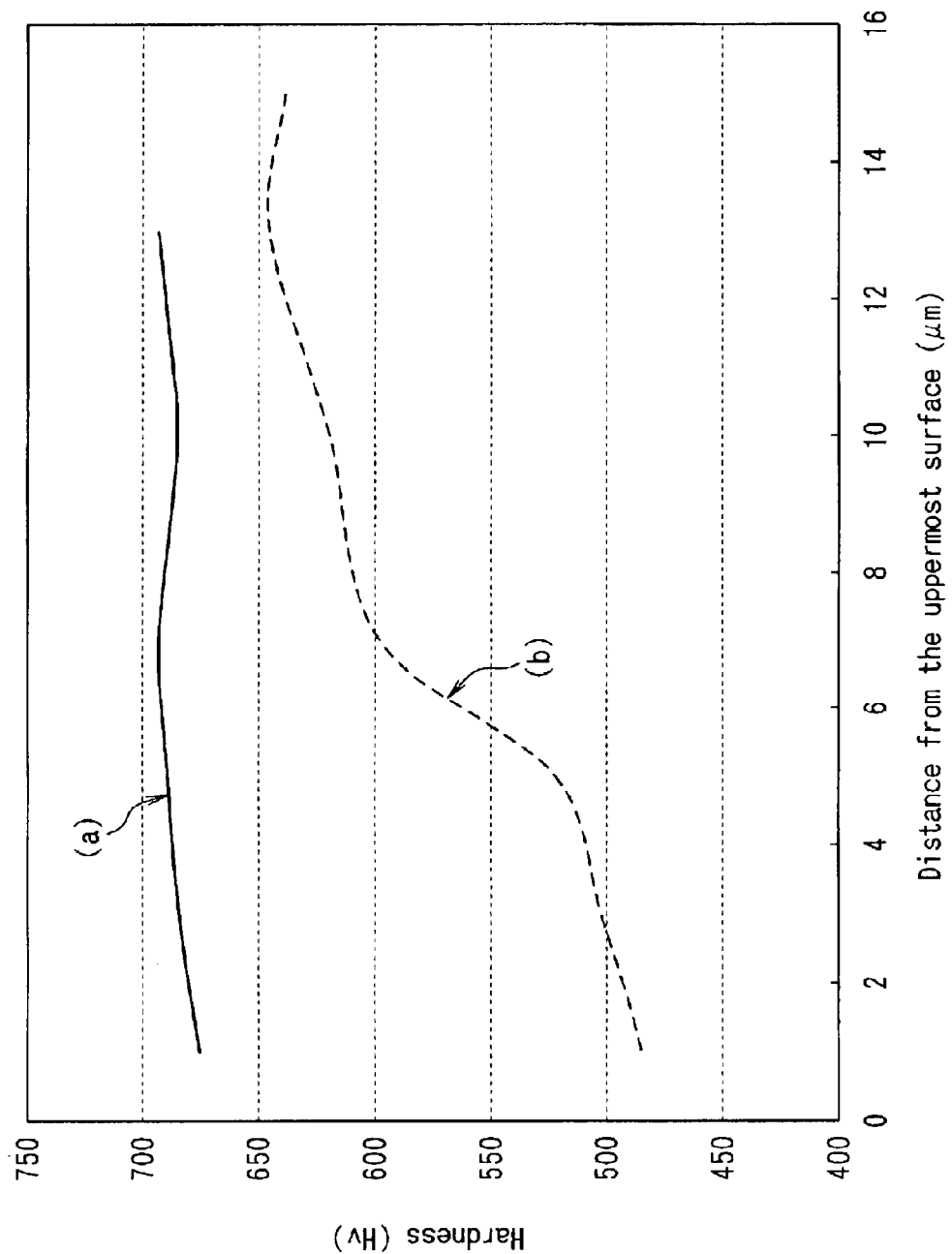
FIG. 3 is a graph showing the distribution for the hardness at the surface layer of the nitride layer in which (a) shows an example of a nitride layer of a cage according to the present invention and (b) shows an example of a nitride layer of an existent cage.

(1) Gas soft nitriding by $N_2$ + $NH_3$
(2) Nv super nitriding
(3) Palsonite treatment
(4) Ion nitriding
(5) Tufftride method
(6) Gas soft nitriding by RX Gas + $NH_3$ Further, FIG. 1 is a view plotting the results of each of examples and comparative examples in the graph expressing the thickness of the nitride layer on the abscissa and the hardness of the nitride layer on the ordinate. FIG. 2 is a graph showing a relation between the hardness of the nitride layer on the surface of the cage and the wear amount of the cage.

As can be seen from the result, the wear amount of the cage is decreased remarkably in Nos. 1-1 to 1-8(examples) that can satisfy the conditions of the present invention (hardness of Hv 650 or more and thickness 3 μm or more and 15 μm or less in the nitride layer) compared with Nos. 1-9 to 1-12 that can not satisfy the conditions of the present invention (comparative examples). In No. 1-12, the hardness of the nitride layer was as hard as Hv 680 but the wear amount was large. For this reason, it is supposed that since the thickness of the nitride layer is as thin as 2 μm, a not uniform nitride layer was formed and a large wear was caused, particularly, in a thin portion.

Further, as can be seen from the graph in FIG. 2, the hardness of the nitride layer is preferably Hv 700 or more in order to further decrease the wear amount of the cage. While the effect of reducing the wear amount is larger as the hardness of the nitride layer is greater, when the hardness on the surface of the cage is larger than that of the rolling element or the bearing ring, since this may also possibly cause wear in the rolling element or the bearing ring owing to this, it is preferred that the upper limit for the hardness of the nitride layer of the cage is preferably Hv 900 in view of the above.

Second Embodiment

At first, a cage for use in a self-aligning roller bearing (JIS bearing No. 22310) was manufactured by a pressing method using a cold rolled steel sheet made of SPCC. Then, a nitride layer was formed to various thickness on the surface of each cage by conducting the nitriding (1)–(6) described above under each of the following conditions.

In Nos. 2-1 to 2-5, the method (1) was conducted at a temperature of 540° C. while changing the treatment time in a range from 0.5 hours to 1.5 hours. After the nitriding, oil cooling was conducted.

In Nos. 2-6 to 2-10, the method (2) was conducted while controlling the treating conditions of keeping in a $NH_3$ gas atmosphere after fluoridation at each temperature within a range of temperature from 410 to 525° C. and for treatment time of from 3.0 to 48 hours. Further, the cooling method after nitriding adopts a method of conducting heating at 400° C. for 1 hour in an atmospheric air after gradual cooling and then applying water cooling.

In Nos. 2-11 to 2-14, the method (3) was conducted under the conditions at each temperature within a range of the temperature from 450–520° C. and for treatment time of 3.0 hours. Further, as the cooling method after nitriding, oil cooling was conducted for No. 2-11 and water cooling was conducted in Nos. 2-12 to 2-14.

In Nos. 2-15 and 2-16, the method (2) was conducted under the treating conditions of keeping in an $NH_3$ gas atmosphere after fluoridation at a temperatures of 500° C. and for a treatment time of 3.0 hours. Further, water cooling was conducted after nitriding.

In No. 2-17, the method (1) was conducted under the conditions at a temperature of 570° C. and for a treatment time of 1.5 hours. Further, oil cooling was conducted after nitriding.

In Nos. 2-18 and 2-19, the method (5) was conducted under the conditions at a temperature of 600° C. and for a treatment time of 1.5 hours. Further, oil cooling was conducted after nitriding.

In Nos. 2-20 and 2-21, the method (6) was conducted under the conditions at a temperature of 600° C. and for a treatment time of 1.5 hours. Further, oil cooling was conducted in No. 2-20 and gradual cooling was conducted in No. 2-21 after nitriding.

In Nos. 2-22 and 2-23, the method (1) was conducted under the conditions at a temperature of 540° C. and for a treatment time of 2.0 hours. Further, gradual cooling was conducted in No. 2-22 and oil cooling was conducted in No. 2-23 after nitriding.

In No. 2-24, the method (1) was conducted under the conditions at a temperature of 540° C. and for a treatment time of 4.0 hours. Further, oil cooling was conducted after nitriding.

Then, self-aligning roller bearing was assembled by using each of the obtained cages and a drop impact test shown below was conducted. A cage manufactured by pressing method with no nitriding (No. 2-25) was also provided and self-aligning roller bearing using this cage was also assembled.

Figure 4:
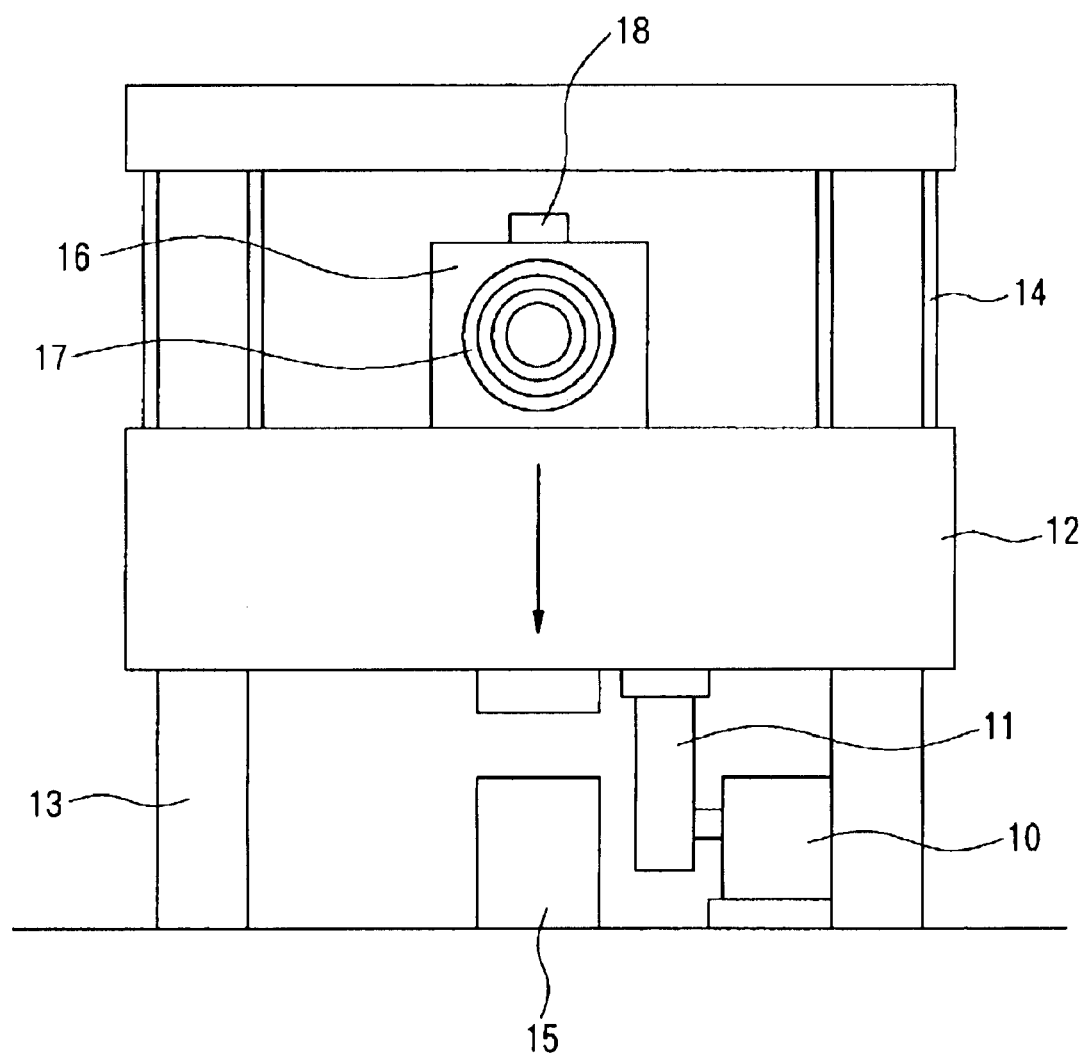
FIG. 4 is a schematic constitutional view showing a drop impact tester used in a second embodiment.

In this test, a drop impact tester shown in FIG. 4 was used. In this tester, a dropping block 12 is adapted to move vertically along two studs 13 by a guide cam mechanism 11 driven by a motor 10. Springs 14 are incorporated in the studs 13 above the dropping block 12. A stopper 15 is provided below the dropping block 12. The dropping block 12 after dropping abuts against the stopper 15 and stops at a position slightly above the lower most point.

A housing 16 for attaching a test bearing 17 is secured to an upper portion of the dropping block 12. An acceleration sensor 18 is attached to the housing 16.

As a test bearing 17, each of the self-aligning roller bearings inserted with a shaft at an aligning angle of 0 is inserted and secured slightly in the housing 16, so that the inner and outer rings and the cage are not rotated in the housing 16 upon dropping of the dropping block 12.

In this state, a process of dropping the dropping block 12 at a predetermined acceleration and then lifting it was repeated by driving the motor 10. Thus, when the dropping block 12 abuts against the stopper 15, an impact load is applied to the test bearing 17 by way of the dropping block 12 and the housing 16.

Using the tester, the vertical movement conducted twice in one sec at a dropping acceleration of 180 G was repeated till fracture was caused to the cage. The cycle of repetition was examined for each of the test bearings to calculate a relative value based on that for No. 2-25 being as "1," and the mechanical strength of the cage was evaluated in accordance with the value.

Further, for each of the obtained cages, posts of the cage were out and the cut surface was polished. The indentation hardness of the nitride layer and the diffusion layer was measured by using the polished surface. The hardness of the nitride layer was measured by the nano-indentation method at a position of 2 to 4 μm depth from the outermost surface in the same manner as the first embodiment. The hardness of the diffusion layer was measured for hardness (H1) at a position of 30 μm depth from the boundary relative to the nitride layer by using the micro vickers hardness tester.

When the polished surface of the cage is etched with 5% alcohol nitride solution (NITAL etching solution), the nitride layer is not etched but the diffusion layer was etched. Accordingly, the boundary position between the nitride layer and the diffusion layer can be distinguished by observing the polished surface under an optical microscope after conducting the etching treatment. Further, the thickness of the nitride layer was measured by the same method as in the first embodiment.

Further, the hardness of the polished surface was measured by using a micro vickers hardness tester on every 10 μm from the outermost surface of the diffusion layer. The depth of the diffusion layer to reach the core portion hardness (H2) was examined by the measurement, and the depth was defined as the thickness of the diffusion layer. Further, the ratio (H1/H2) of the hardness (H1) of the diffusion layer relative to the vickers hardness(H2) of the core portion was calculated.

The result of the measurement are shown in the following Table 2.

TABLE 2

| No. | Nitriding Method | Temperature (° C.) | Cooling | Nitride Layer Thickness (μm) | Nitride Layer Hardness (Hv) | Diffusing Layer Thickness (μm) | Diffusing Layer Hardness (Hv) | Core hardness (HV) | Hardness ratio | Relative strength |
|---|---|---|---|---|---|---|---|---|---|---|
| 2-1 | (1) | 540 | Oil cooling | 15 | 650 | 120 | 263 | 161 | 1.63 | 2.12 |
| 2-2 | (1) | 540 | | 13 | 660 | 100 | 245 | 145 | 1.69 | 2.15 |
| 2-3 | (1) | 540 | | 14 | 656 | 90 | 221 | 153 | 1.44 | 1.73 |
| 2-4 | (1) | 540 | | 14 | 661 | 90 | 213 | 153 | 1.39 | 1.75 |
| 2-5 | (1) | 540 | | 13 | 660 | 50 | 170 | 129 | 1.32 | 1.52 |
| 2-6 | (2) | 525 | Gradual cooling | 10 | 750 | 130 | 280 | 161 | 1.74 | 2.22 |
| 2-7 | (2) | 500 | ↓ | 8 | 755 | 110 | 245 | 148 | 1.66 | 2.17 |
| 2-8 | (2) | 480 | Heating | 7 | 761 | 110 | 223 | 128 | 1.74 | 2.25 |
| 2-9 | (2) | 440 | ↓ | 5 | 770 | 80 | 208 | 148 | 1.41 | 1.94 |
| 2-10 | (2) | 410 | Water cooling | 4 | 754 | 110 | 223 | 120 | 1.86 | 2.19 |
| 2-11 | (3) | 525 | Oil cooling | 9 | 751 | 150 | 275 | 143 | 1.92 | 2.42 |
| 2-12 | (3) | 480 | Water | 7 | 760 | 80 | 274 | 145 | 1.89 | 2.29 |
| 2-13 | (3) | 460 | cooling | 6 | 761 | 90 | 283 | 138 | 2.05 | 2.34 |
| 2-14 | (3) | 450 | | 6 | 759 | 60 | 263 | 145 | 1.81 | 2.12 |
| 2-15 | (2) | 500 | | 8 | 750 | 100 | 299 | 146 | 2.05 | 2.14 |
| 2-16 | (2) | 500 | | 8 | 748 | 500 | 299 | 120 | 2.49 | 2.14 |
| 2-17 | (1) | 570 | Oil cooling | 10 | 666 | 80 | 301 | 120 | 2.51 | 1.73 |
| 2-18 | (5) | 570 | | 16 | 632 | 100 | 199 | 155 | 1.28 | 1.28 |
| 2-19 | (5) | 600 | | 20 | 593 | 140 | 174 | 135 | 1.29 | 1.29 |
| 2-20 | (6) | 600 | | 21 | 590 | 130 | 175 | 138 | 1.27 | 1.15 |
| 2-21 | (6) | 600 | Gradual | 20 | 592 | 120 | 138 | 133 | 1.04 | 0.98 |
| 2-22 | (1) | 540 | cooling | 14 | 671 | About 0 | 145 | 143 | 1.01 | 0.96 |
| 2-23 | (1) | 540 | Oil cooling | 15 | 653 | 40 | 221 | 138 | 1.60 | 1.12 |
| 2-24 | (1) | 570 | | 25 | 580 | 510 | 287 | 120 | 2.39 | 1.21 |
| 2-25 | | Not formed | | — | — | — | ˣ160 | 125 | 1.28 | 1 |

Figure 5:
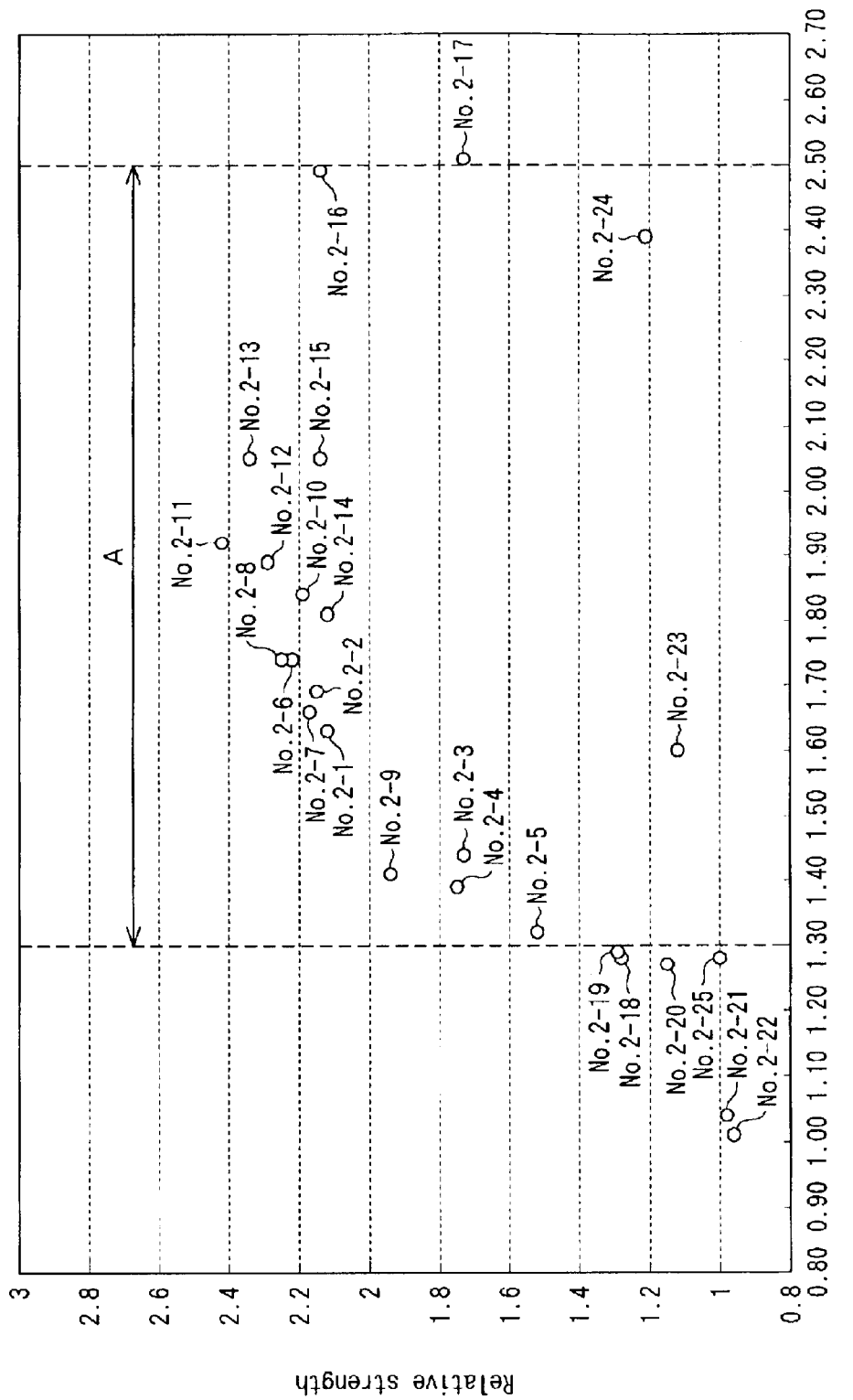
FIG. 5 is a graph showing a relation between the relative strength and a ratio (H1/H2) obtained from the result of a drop impact test conducted in the second embodiment.
Figure 6:
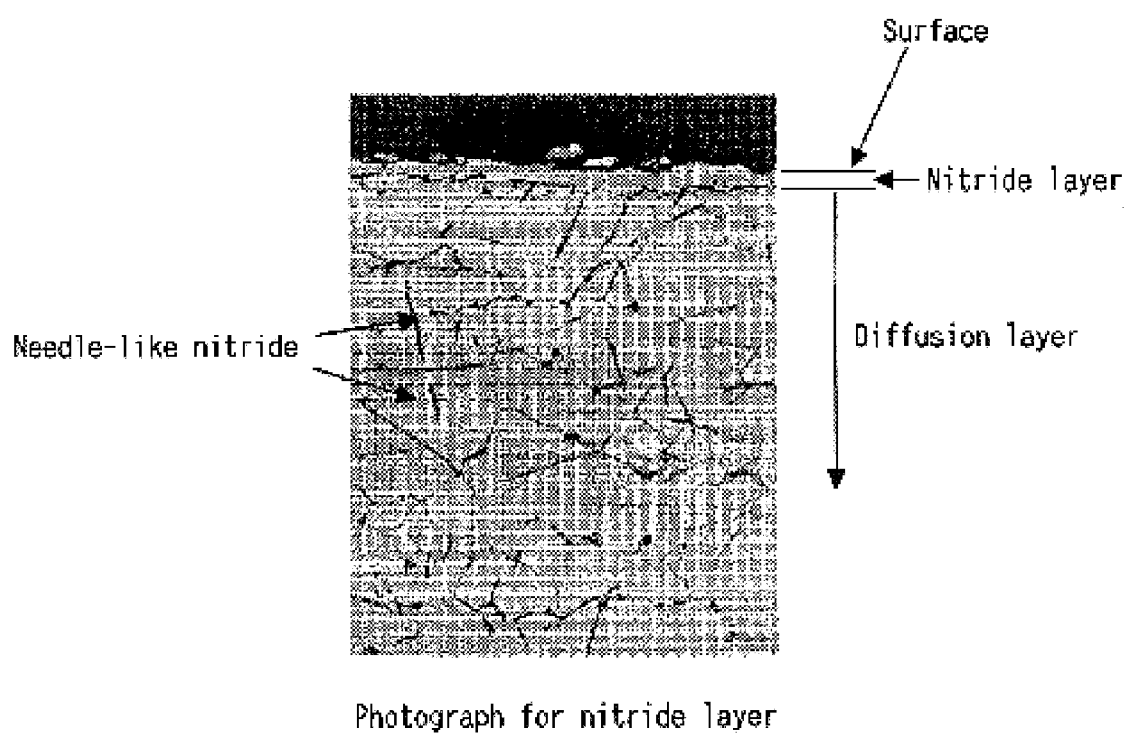
FIG. 6 is a microscopic photograph showing the cross section of a cage applied with nitriding. The photograph shows a state in which needle like nitrides are precipitated in the diffusion layer.

(1) Gas soft nitriding by $N_2$ + $NH_3$
(2) Nv super nitriding
(3) Palsonite treatment
(5) Tufftride method
(6) Gas soft nitriding by RX Gas + $NH_3$
ˣHardness of work hardened layer Further, FIG. 5 is a graph showing a relation between the relative strength obtained by the result of the dropping impact test and the ratio (H1/H2). FIG. 6 shows a microscorpic photograph for the cross section of the nitrided cage.

As can be seen from the result, in Nos. 2-1 to 2-17 having a nitride layer of Hv 650 or more and a thickness of 3 μm or more and 15 μm or less on the surface, having a diffusion layer of a thickness of 50 μm or more and 500 μm or less just below the nitride layer, the hardness (H1) of the diffusion layer is 160 or more in vickers hardness and the ratio (H1/H2) of 1.30 or more, the mechanical strength of the cage is increased compared with Nos. 2-18 to 2-25 that can not satisfy at least one of these conditions. Referring to concrete numerical values, the relative strength of Nos. 2-1 to 2-17 is from 1.52 to 2.42, whereas the relative strength of Nos. 2-18 to 2-25 is from 0.96 to 1.29.

In Table 2, underlines are attached to the data out of the range of the constituent factors. Further, numerical values described in the column for "diffusion layer hardness" for No. 2-25 is a hardness of the work hardened layer and "hardness ratio" is a value calculated by using the value.

In Nos. 2-21 and 2-22, since cooling after nitriding was conducted only by gradual cooling, nitrides were precipitated in the diffusion layer just below the nitride layer, so that effect for improving the hardness due to the diffusion of nitrogen was scarcely obtained and the difference between the hardness of the diffusion layer and the hardness of the core was extremely decreased. Particularly, in No. 2-22, since diffusion of nitrogen to the matrices just below the nitride layer was scarcely confirmed, it is described as "about 0" in the column for the thickness of the diffusion layer.

Among Nos. 2-1 to 2-17 capable of satisfying all of the constituent factors, in Nos. 2-1 and 2-2, Nos. 2-6 to 2-8 and Nos. 2-10 to 2-16 in which the ratio (H1/H2) is within a range of 1.30 more and 2.50 or less (range indicated by "A" FIG. 5) and the hardness (H1) of the diffusion layer is 223 or more by vickers hardness has a relative strength of 2.0 or more and the mechanical strength of the cage is particularly higher.

Third Embodiment

At first, a cage for use in a self-aligning roller bearing (JIS bearing No. 22310) was manufactured by a pressing method using a cold rolled steal sheet made of SPCC. Then, a nitride layer and an oxide layer were formed to various thickness on the surface of each cage by conducting nitriding and formation of oxide layer in (1) to (5) under each of the following conditions.

In Nos. 3-1 to 3-4, the method (1) as was conducted nitriding while changing the treatment temperature and the treatment time on every samples and then oil cooling was conducted. Subsequently, an oxide layer was formed on the nitride layer by conducting rapid heating again to each nitriding temperature in atmospheric air, keeping each of the samples at the temperature for a predetermined time within a range from 10 min to 1 hour and then conducting rapid cooling. The oxide layer formation treatment was not conducted for No. 3-4.

In Nos. 3-5 and 3-6, the method (2) as was conducted nitriding while changing the treatment temperature and the treatment time on every samples and then oil cooling was conducted. Subsequently, an oxide layer was formed on the nitride layer by the method described above.

In Nos. 3-7 to 3-11, after conducting the method (3) as nitriding while changing the treatment temperature and the treatment time on every samples, oil cooling was conducted. Then, an oxide layer was formed on the nitride layer by the method described above.

In No. 3-12, after conducting the method (4) as nitriding, oil cooling was conducted. Then, an oxide layer was formed on the nitride layer by the method described above.

In Nos. 3-13 to 3-17, after conducting the method (5) as nitriding while changing the treatment temperature and the treatment time on every samples, oil cooling was conducted. Then, an oxide layer was formed on the nitride layer by the method described above.

In No. 3-18, nitriding was not conducted and an oxide layer was formed by conducting "steam oxidation" by keeping the cage after pressing in a steam atmosphere at 400-500° C. for 1-2 hours.

In No. 3-19, both of nitriding and oxidation layer formation were not conducted and a manganese phosphate layer formation was conducted to the cage after pressing.

Then, self-aligning roller bearings were assembled by using each of the obtained cages and a wear test shown below was conducted.

The wear test was conducted by attaching an unbalanced weight to a shaft, supplying a lubricant "VG5" from an oil bath while applying vibrations at a maximum amplitude of 0.7 mm compulsorily by the rotation of the weight and rotating bearing under the conditions at a rotational speed of 3000_min_$^{-1}$ for 2000 hours. The weight of the cage was measured before and after the test and the weight reduction was calculated as a wear amount. As the measured value of the wear amount for each of the samples, a relative value was calculated based on that for No. 3-19 been assumed as "1" and the wear resistance of the cage was evaluated in accordance with this value.

Further, for examining the corrosion resistance of each of the cages, a salt spray test according to "JIS Z2371" was conducted. The appearance of the cage was visually observed after the test to judge whether rust occurred or not on the surface. "X" indicates a case for the occurrence and "○" indicates a case for no occurrence of rust.

Further, for each of the cages in Nos. 3-1 to 3-18, the crystal structure of the oxide layer on the surface was examined by X-ray diffractiometry using CoKα rays. AS an x ray diffractiometry apparatus, "RINT-2" manufactured by RIGAKU Co. was used.

Further, for each of the cages in Nos. 3-1 to 3-19, the thickness of the oxide layer on the surface was measured by examining the distribution of concentration of oxygen (O) in the direction of the depth by XPS X-ray photoelectron spectroscope.

The results are shown in the following Table 3.

TABLE 3

| No. | Treatment after pressing | | Nitride layer | | Oxide layer | | Wear amount (Relative value) | Corrosion resistance |
|---|---|---|---|---|---|---|---|---|
| | Nitriding | Formation of oxide layer | Thickness (μm) | Hardness (Hv) | Thickness (μm) | Phase | | |
| 3-1 | Method (1) | Formed | 7 | 680 | 0.10 | $Fe_3O_4$ | 0.13 | ○ |
| 3-2 | | | 10 | 745 | 0.06 | $Fe_3O_4$ | 0.09 | ○ |
| 3-3 | | | 10 | 671 | <u>0.04</u> | $Fe_3O_4$ | 0.23 | ○ |
| 3-4 | | Not formed | 9 | 689 | <u>0.03</u> | $Fe_3O_4$ | 0.21 | ○ |
| 3-5 | Method (2) | Formed | 10 | 752 | 0.06 | $Fe_3O_4$ | 0.11 | ○ |
| 3-6 | | | 15 | 748 | 3.40 | $Fe_3O_4$ | 0.09 | ○ |
| 3-7 | Method (3) | Formed | 10 | 779 | 0.09 | $Fe_3O_4$ | 0.06 | ○ |
| 3-8 | | | 10 | 768 | 0.05 | $Fe_3O_4$ | 0.07 | ○ |
| 3-9 | | | 11 | 768 | 2.20 | $Fe_3O_4$ | 0.09 | ○ |
| 3-10 | | | 8 | 768 | 3.70 | <u>$Fe_3O_4 + Fe_2O_3$</u> | 0.73 | ○ |
| 3-11 | | | 8 | 732 | 5.30 | <u>$Fe_3O_4 + Fe_2O_3$</u> | 0.88 | ○ |
| 3-12 | Method (4) | Formed | 9 | 693 | 0.05 | $Fe_3O_4$ | 0.14 | ○ |
| 3-13 | Method (5) | Formed | 8 | 657 | 0.05 | $Fe_3O_4$ | 0.12 | ○ |
| 3-14 | | | 12 | 664 | 1.10 | $Fe_3O_4$ | 0.10 | ○ |
| 3-15 | | | 8 | 658 | 0.30 | $Fe_3O_4$ | 0.09 | ○ |
| 3-16 | | | <u>20</u> | <u>583</u> | 0.04 | $Fe_3O_4$ | 0.76 | ○ |
| 3-17 | | | <u>16</u> | <u>627</u> | 0.08 | $Fe_3O_4$ | 0.66 | ○ |
| 3-18 | Not formed | Formed[X1] | <u>0</u> | 145[X3] | 0.07 | $Fe_3O_4$ | 0.88 | ○ |
| 3-19 | | Not formed[X2] | <u>0</u> | 130[X3] | <u>0.02</u> | — | 1 | x |

Figure 7:
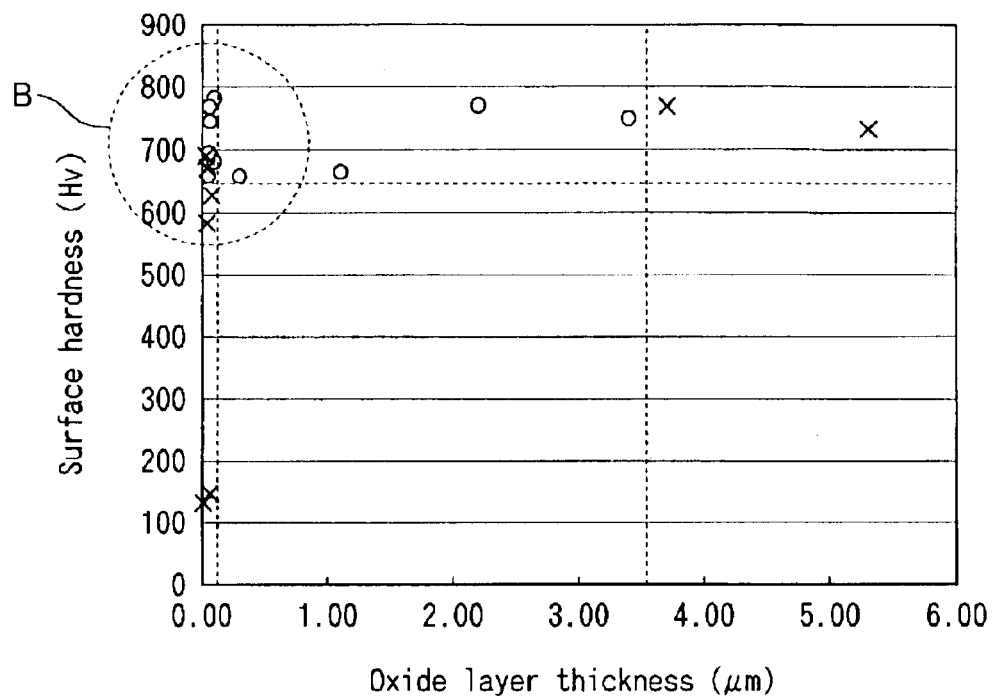
FIG. 7 is a graph showing a relation between the thickness of an oxide layer and the surface hardness obtained from data shown in Table 3 for a third embodiment.
Figure 8:
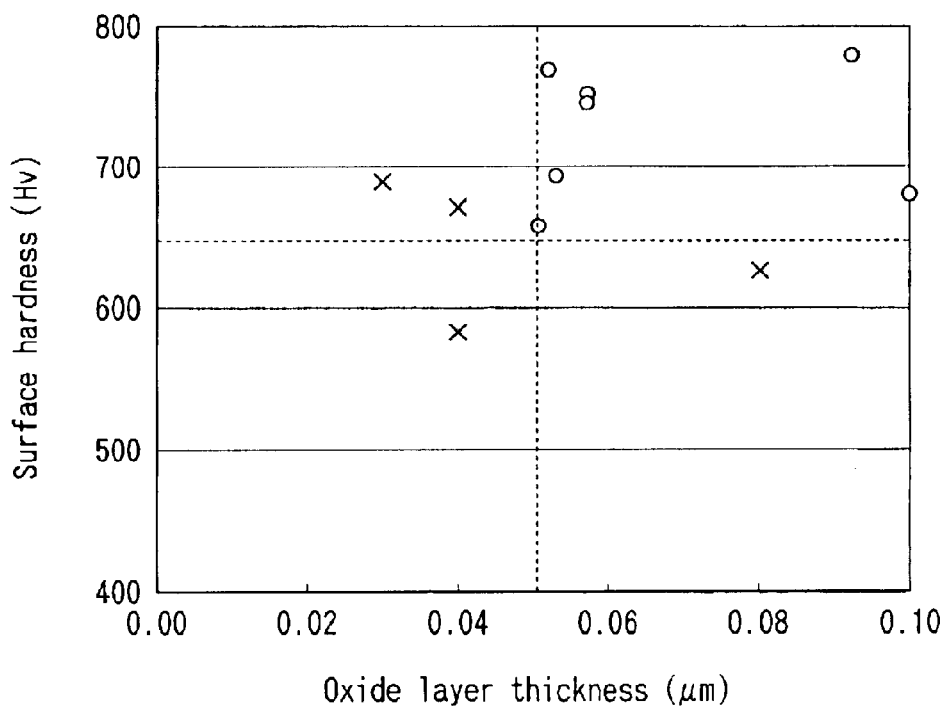
FIG. 8 is a graph for the enlarged portion B in FIG. 7.

(1) Gas soft nitriding by $N_2 + NH_3$
(2) Nv super nitriding
(3) Palsonite treatment
(4) Ion nitriding
(5) Tufftride method
[X1]Steam oxidation by heating at 400~500° C. after pressing
[X2]Formation of manganese phosphate film after pressing
[X3]Hardness of work hardened layer Further, a relation between the thickness of the oxide layer and the surface hardness obtained from the result are shown by graphs in FIG. 7 and FIG. 8. FIG. 8 is a graph by enlarging a portion B in FIG. 7.

As can be seen from the result, No. 3-1, No. 3-2, Nos. 3-5 to 3-9, Nos. 3-12 to 3-15 each having a nitride layer with a hardness of Hv 650 or more and a thickness of 3 μm or more and 15 μm or less on the surface, and having an oxide layer comprising an $Fe_3O_4$ phase as a main ingredient and not containing an $Fe_2O_3$ phase further on the surface of the nitride layer at a thickness of 50 nm or more show increased wear resistance of the cage, compared with No. 3-3, No. 3-4, No. 3-10, NO. 3-11, Nos. 3-16 to 3-19 that can not satisfy at least one of the constituent factors. Further, the corrosion resistance was favorable except for No. 3-19 having a surface oxide layer at a thickness of 0.02 μm.

In Table 3, underlines are applied to the data out of the range of the constituent factors described above. In Nos. 3-18 and 3-19, numerical values described in the column for "hardness of nitride layer" indicate hardness of work hardened layers.

Further, for examining a relation between the thickness of the oxide layer and the wear resistance on the surface, a ball-on-desk wear test was conducted.

At first, a test specimen of 40 mm diameter, 3 mm thickness and 0.004 Ra of surface roughness was prepared by using SPCC. Then, nitriding was conducted to the specimen by the method (1) described above under the conditions at a temperature of 450° C. and for a treatment time of 3 hours. After nitriding, oil cooling was conducted and then atmospheric oxidation was conducted under the conditions at a treatment temperature within a range of each temperature than 300 to 500° C., and for a treatment time within a rage of each treatment time from 10 min to 1 hour.

Further, a test specimen formed by not conducting the oxidation layer formation treatment after nitriding and applying a manganese phosphate film formation treatment (control example) was also prepared. An oxide layer of 20 nm thickness was formed on the surface of the test specimen.

Figure 9:
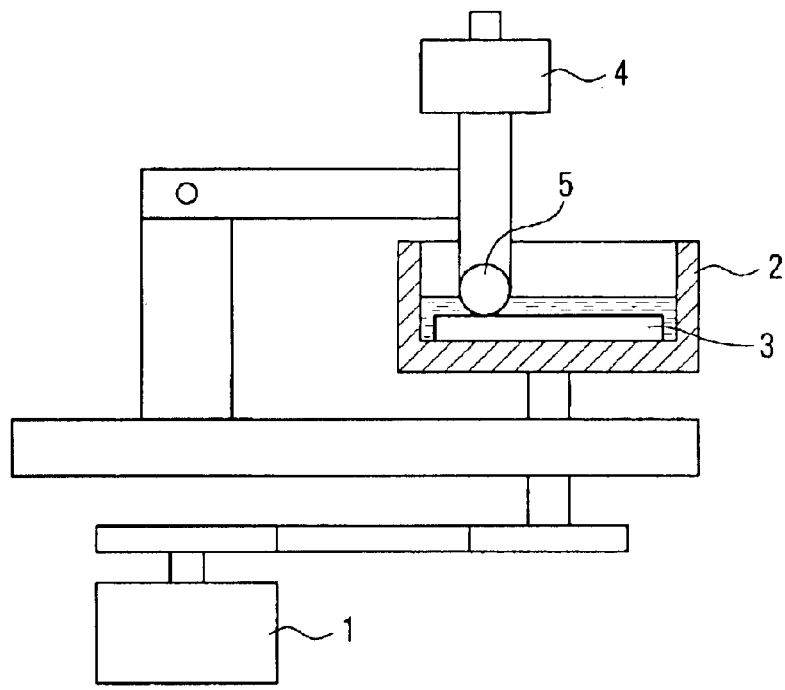
FIG. 9 is a schematic constitutional view showing a ball-on-desk tester used in a third embodiment.

FIG. 9 shows a ball-on-desk tester used. The tester has an oil bath 2 rotated by a motor 1 and constituted such that a test specimen 3 is fixed in the oil bath 2 and a ball 5 applied with a load P by a weight 4 is pressed on the test specimen 3. As the ball 5, a ball made of SUJ2 having a diameter of $9.5 \times 10^{-3}$ m (3/8 inch) was used.

Using the tester, 30 ml of a lubricant "VG5" was charged in the oil bath 2 and the oil bath 2 was rotated at a circumferential speed of 200 m/s for 20 min under the load P of 9.8 N. The mass of the test specimen 3 was measured before and after the test to examine the amount of the reduction as a wear amount. For the measured value of the wear amount an each sample, a relative value was calculated based on the wear amount in the test specimen of the control example being assumed as "1", and the value was defined as "wear amount ratio".

Figure 10:
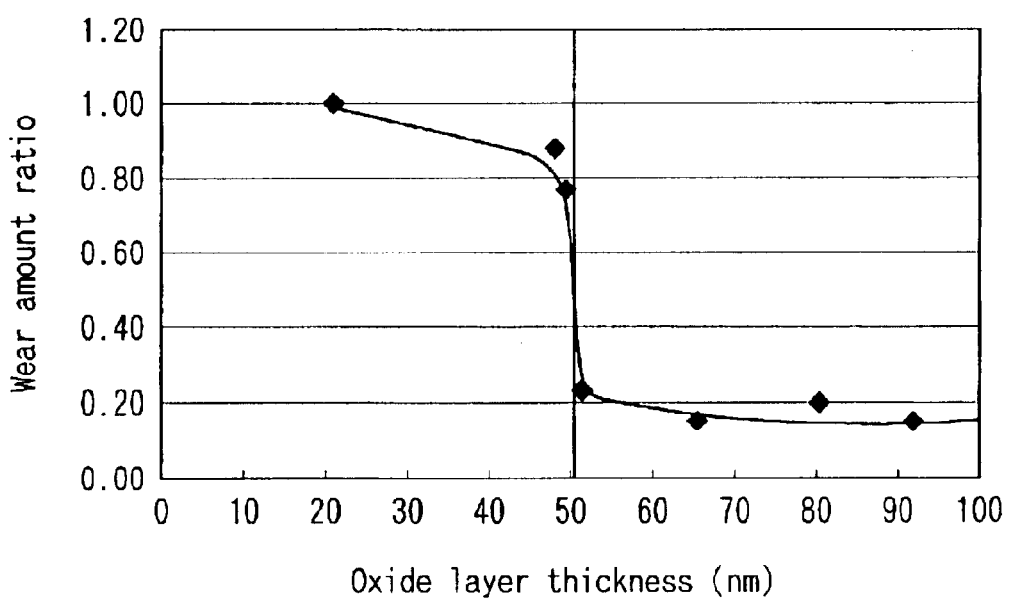
FIG. 10 is a graph showing a relation between the thickness of an oxide layer and a wear amount ratio of a cage obtained from a result of the ball-on-desk wear test conducted for the third embodiment.
Figure 11:
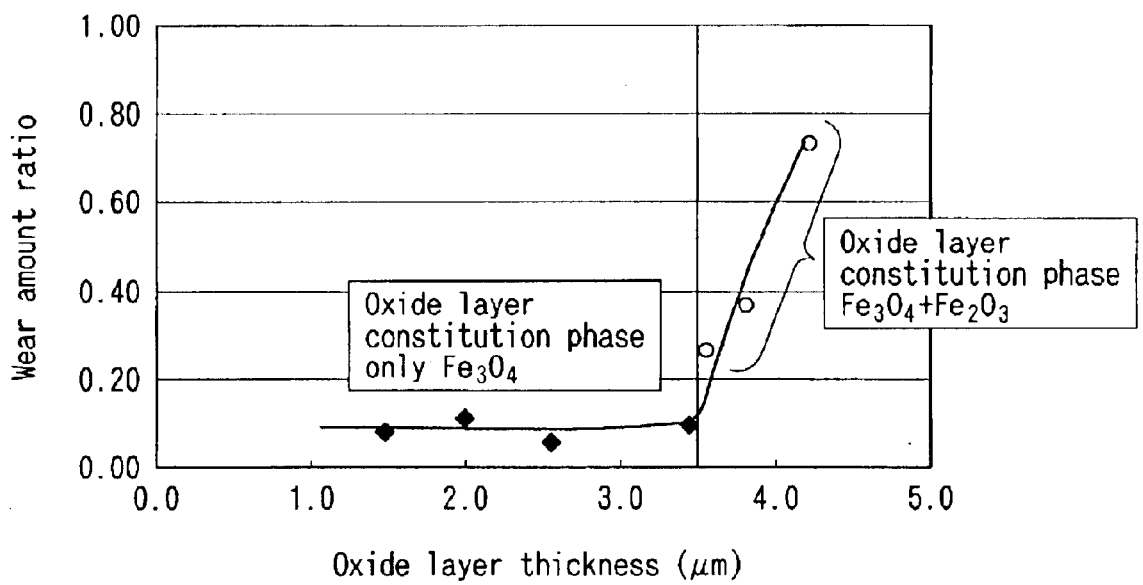
FIG. 11 is a graph showing a relation between the thickness of an oxide layer and a wear amount ratio of a cage obtained from a result of the ball-on-desk wear test conducted for the third embodiment.

The test result is shown in the graphs of FIGS. 10 and 11.

It can be seen from the graph in FIG. 10, that the wear amount ratio is remarkably decreased as the thickness of the oxide layer is 50 nm or more. Further, as can be seen from the graphs in FIGS. 10 and 11, the wear amount ratio is kept small within the range of the thickness for the oxide layer of 50 nm or more and 3.5 μm or less, whereas the wear amount ratio increases as the thickness for the oxide layer increases when the thickness of the oxide layer exceeds 3.5 μm.

Further, when the crystal structure of the oxide layer was measured for each of the samples described above by the method described above, the crystal structure consisted only of the $Fe_3O_4$ phase when the thickness of the oxide layer was 3.5 μm or less. However, when the thickness of the oxide layer exceeded 3.5 μm, the crystal structure comprised $Fe_3O_4$ phase and $Fe_2O_3$ phase. Accordingly, under the oxide layer forming conditions described above, it is necessary to keep the thickness of the oxide layer to 3.5 μm or less in order to obtain an oxide layer not containing the $Fe_2O_3$ phase.

Further, for examining a relation between the hardness of the nitride layer and the wear resistance on the surface, a test specimen for use in the ball-on-desk wear test was prepared while changing the hardness of the nitride layer under the identical oxide layer forming conditions. Nitriding was conducted by the method (1) described above while changing the temperature and the treatment time. After the nitriding, oil cooling was conducted and then atmospheric oxidation was conducted under the conditions at a treatment temperature of 400° C. and for a treatment time of 1 hour. By the oxidation treatment, an oxide layer of 100 nm thickness was formed on the surface of the nitride layer. The hardness of the nitride layer was measured by the same method as in the first embodiment.

Using each of the obtained test specimens, the ball-on-desk wear test was conducted by the same method as described above to measure the wear amount. From each of the measured values, a relative value was calculated based on the wear amount of the test piece having the hardness of the oxide layer of Hv 100 being assumed as "1" and this was defined as a wear amount ratio.

Figure 12:
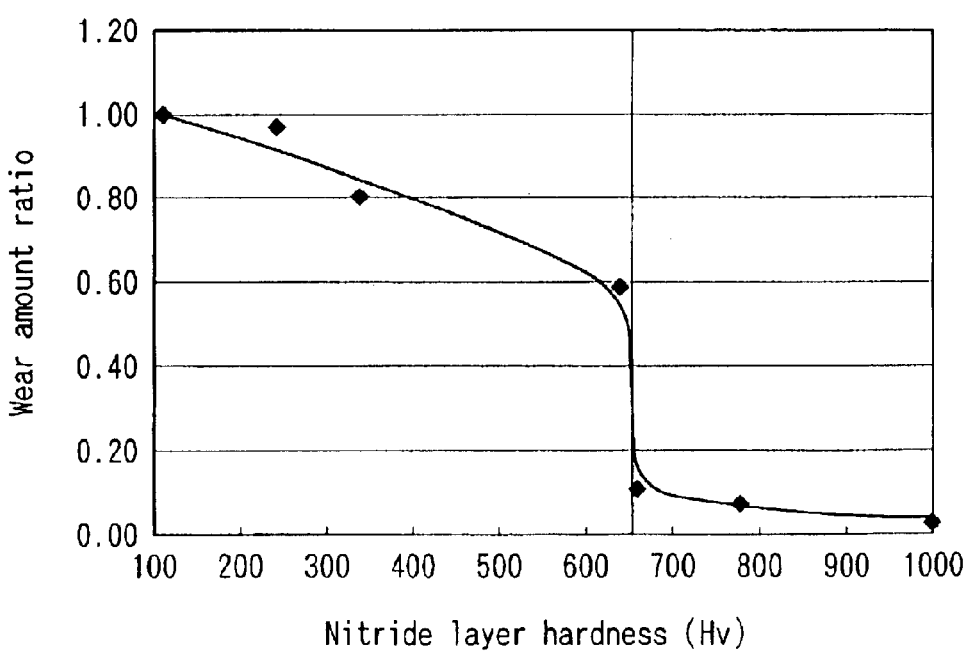
FIG. 12 is a graph showing a relation between the hardness of the nitride layer and a wear amount ratio of a cage obtained from a result of the ball-on-desk wear test conducted for the third embodiment.

The test result is shown by the graph in FIG. 12. It can be seen from the graph that the wear resistance is improved when the hardness of the nitride layer is 650 or more in the vickers hardness (Hv).

In each of the embodiment described above, the test was conducted using cages for use in self-aligning roller bearings, but the present invention is applicable, irrespective of the type of the bearings, to the cages for use in all rolling bearings such as ball bearings, cylindrical roller bearings and tapered roller bearings.

Industrial Applicability

As has been described above the present invention provides a cage in which a nitride layer is formed on the surface by using an iron and steel material with a carbon content of 0.25% by weight or less, fabricating it into a predetermined shape and conducting nitriding, which is more excellent in slidability and wear resistance than conventional one, by defining the hardness and the thickness.

Further, the mechanical strength of the cage can be increased by restricting the diffusion layer just below the nitride layer to a predetermined thickness and a predetermined hardness.

Further, the corrosion resistance is improved and higher wear resistance is obtained by forming an oxide layer of a predetermined crystal structure at a predetermined thickness further on the surface of the nitride layer.

What is claimed is:

1. A cage fabricated into a predetermined shape by using an iron or steel material with a carbon content of 0.25% by weight or less and then conducting nitriding to form a nitride layer on the surface in which, a nitride layer having a hardness of 650 or more by vickers hardness (Hv) is formed at a thickness of 3 μm or more and 15 μm or less.

2. A cage as defined in claim 1, wherein a diffusion layer in which nitrogen is diffused in a matrix is formed at a thickness of 50 μm or more and 500 μm or less just below the nitride layer, the vickers hardness (H1) of the diffusion layer at a position of 30 μm depth from the boundary to the nitride layer is 160 or more, and a ratio (H1/H2) of the hardness(H1) of the diffusion layer relative to the vickers hardness (H2) of the core is 1.30 or more.

3. A cage as a defined in claim 2, wherein the hardness (H1) of the diffusion layer is 223 or more by vickers hardness and the ratio (H1/H2) is 1.30 or more and 2.50 or less.

4. A cage as defined in claim 1, wherein an oxide layer comprising an $Fe_3O_4$ phase as a main ingredient and not containing or $Fe_2O_3$ phase is present at a thickness of 50 nm or more further on the surface of the nitride layer.

* * * * *